United States Patent [19]

Barkats

[11] Patent Number: 4,923,152
[45] Date of Patent: May 8, 1990

[54] TWO-LIQUID PROPULSIVE SYSTEM FOR AN ARTIFICIAL SATELLITE AND UTILIZATION OF SAID SYSTEM FOR EJECTING THE SATELLITE

[76] Inventor: Gérard Barkats, Lotissement Persepolis, Domaine de Candéou, 06530 Peymeinade, France

[21] Appl. No.: 33,829

[22] Filed: Apr. 3, 1987

Related U.S. Application Data

[63] Continuation of PCT FR86/00270 filed Jul. 31, 1986, published as WO87/00816 on Feb. 12, 1987.

[30] Foreign Application Priority Data

Aug. 5, 1985 [FR] France .................................. 85 11964

[51] Int. Cl.⁵ ............................ B64G 1/26; B64G 1/40
[52] U.S. Cl. .................................. 244/172; 137/256; 60/257; 244/135 B; 244/169
[58] Field of Search ................ 244/172, 158 R, 169, 244/135 R, 135 C; 60/39.48, 259, 257; 137/209, 590, 256, 268, 624.13

[56] References Cited

U.S. PATENT DOCUMENTS

| | | | |
|---|---|---|---|
| 2,557,438 | 6/1951 | Johnson | 137/256 |
| 3,070,330 | 12/1962 | Escher | 60/257 |
| 3,807,422 | 4/1974 | McJones | 137/256 |
| 4,591,115 | 5/1986 | DeCarlo | 244/135 C |
| 4,609,169 | 9/1986 | Schweickert et al. | 244/135 C |

FOREIGN PATENT DOCUMENTS 2051246  1/1981  United Kingdom ................ 244/172

*Primary Examiner*—Galen Barefoot
*Attorney, Agent, or Firm*—Sughrue, Mion, Zinn, Macpeak & Seas

[57] ABSTRACT

The two-liquid propulsive system for an artificial satellite is characterized in that the components of the propellant are unequally distributed in at least two pairs of tanks (12, 16) and (14, 18) which are associated in such a way as to provide additional fuel in a first pair of tanks and additional oxidizer in a second pair of tanks, and in that the different pairs of tanks are suitable for being used in succession during predetermined time periods so that the exhaustion of a first propellant component in one tank (14 or 16) indicate that the residual normal lifetime of the satellite is at best approximately equal to said predetermined time period, and that after exhaustion of the second propellant component in the tank (16 or 14), the two tanks (12 and 18) each containing an excess quantity of one of the propellant components are associated in order to extract the satellite.

3 Claims, 1 Drawing Sheet

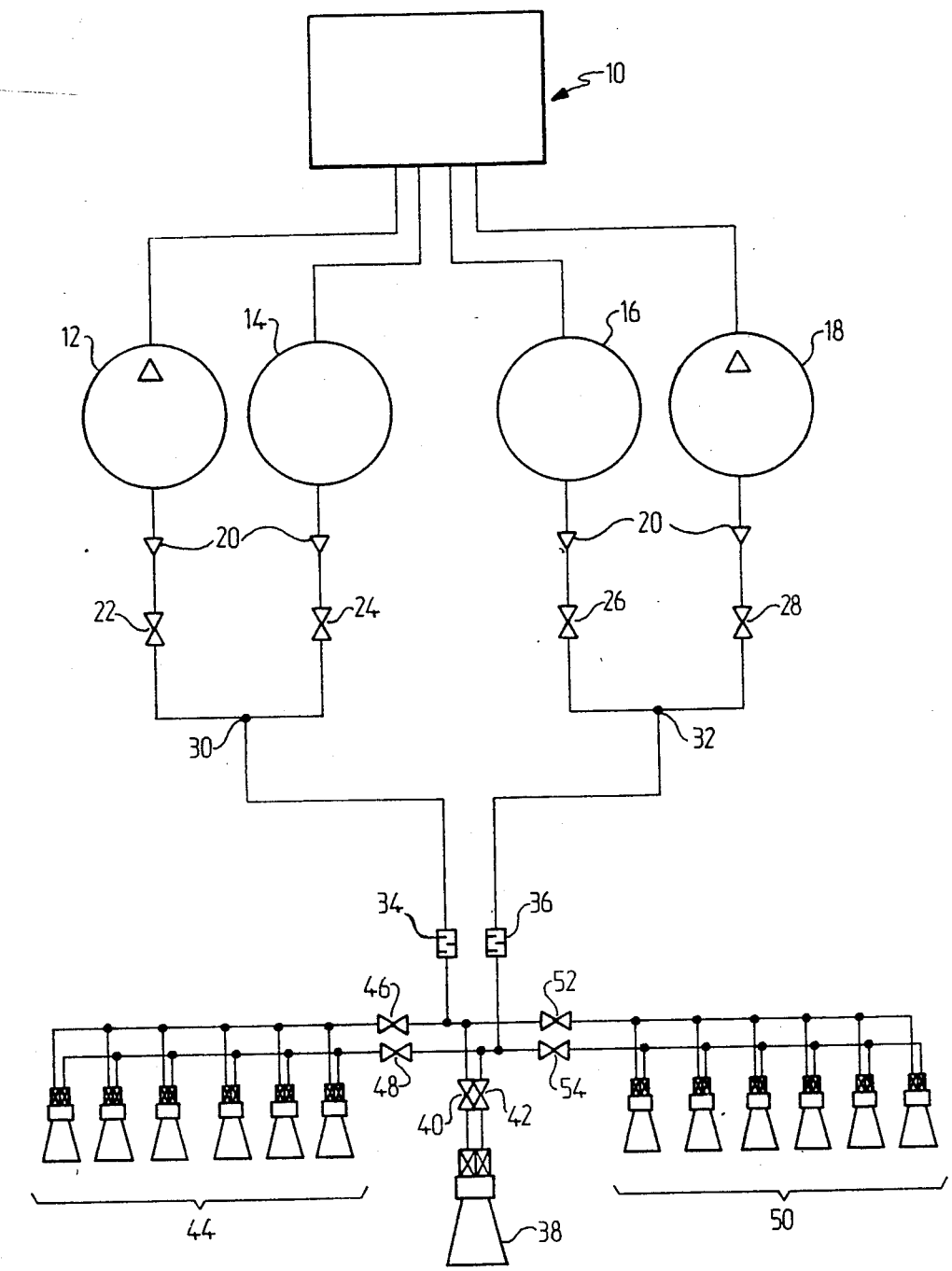

TWO-LIQUID PROPULSIVE SYSTEM FOR AN ARTIFICIAL SATELLITE AND UTILIZATION OF SAID SYSTEM FOR EJECTING THE SATELLITE

The present invention is a continuation of PCT Application No. PCT/FR86/00270 filed July 31, 1986, now abandoned.

The present invention relates to a two-liquid propulsive system for an artificial satellite, in particular for a geostationary satellite, and intended to provide advance warning of the end of the satellite's normal life to enable the satellite to be extracted from its operating orbit. The invention also relates to the utilization of such a two-liquid propulsive system in order to obtain advance warning of the instant when the on-board propellant components will run out, which corresponds to the end of the satellite's normal life, while retaining a sufficient supply of the components to be able to perform an ejection maneuver with the satellite to eject it from its geostationary orbit to a non-operating orbit.

It is appropriate to begin by recalling that communications satellites are placed in an orbit in the equatorial plane of the Earth at about 36,000 km from the Earth. This orbit is circular and possesses the particularity that any object orbiting thereon has a period of rotation of 24 hours around the Earth.

As a result, an object of this orbit appears to an observer on the earth as being stationary above the Earth. Communications satellites use this special orbit since it is better than any other orbit for enabling them to provide their function as communications relays between a plurality of points on the Earth.

However, the growth in this mode of communication and the expected future development thereof have led nations to organize and regulate the use of this orbit.

As a result, a user is required firstly to position a satellite at a specified longitude and to remain there within specified tolerances, and secondly, even at this orbital position, the user will be authorized to use only specified radio frequency bands.

The purpose of such regulations is, naturally, to share the advantages of this orbit equitably, and also to avoid users getting in each other's way by creating interference between different transmissions.

Nevertheless, in spite of improving communications techniques which have made it possible over the years to accept an increasing number of satellites per portion of the geostationary satellite orbit, and to transmit more and more information in the allocated frequency bands, the short term outlook is one of shortage. Not only is the forecast number of users over the forthcoming decades on the increase, but also the economic attraction of this mode of transmission together with increasing communications requirements lead to the prediction that the use of said orbit will soon be saturated.

New techniques have already been made use of to raise the transmission frequency bands, thereby enabling more information to be transmitted. Transmission and reception techniques by means of new types of antenna also make it possible to reduce the portion of orbit arc allocated to each satellite.

Thus, users who are being allocated smaller and smaller portions of the orbit naturally desire to make the best use possible thereof, i.e. to retain on said portion only those satellites which are effective in the communications traffic system being exploited by said users. Satellites that have become obsolescent over the years are thus regularly replaced by new satellites having a longer life expectancy.

For this to be possible, it is necessary not only to move the obsolescent satellite onto an orbit where it will not get in the way of a new satellite or of neighboring satellites, but also to avoid ejecting the obsolescent satellite until it is certain that it is indeed obsolescent, in order to optimize the profitability of the system already in place.

There follows a list of the main ways in which present-day satellites become obsolescent. Once a satellite is in its orbital position, it will be declared unusable should at least one of the following phenomena occur:

(1) one or more essential items of equipment break down and cannot be repaired or replaced by switching over to a redundant item of equipment;

(2) the source of electrical energy by photovoltaic conversion degrades over time and can no longer operate the satellite equipment; or (3) the on-board propellant which enables the satellite to stay in its allocated position on the orbit and also to point properly earthwards runs out.

Without control means, a satellite is subjected to various disturbing forces in its environment and it performs cyclic movements of ever increasing amplitude about its orbital position. Failure to take action in orer to avoid obsolescence is bad for two reasons. By abandoning such satellites on their orbit, the orbit will rapidly become crowded and it will become more and more difficult to replace an obsolete satellite by another satellite of the same family in order to continue the mission. In addition, international regulation will soon ban abandoning satellites in this way, once the amplitude of a satellite's orbital movements runs the risk of allowing it to penetrate into the orbital space allocated to its immediate neighbors.

In general, satellite manufacturers have a good understanding of satellites and satellite equipment, and a premature end of life due to an accidental breakdown in the equipment while the satellite still has a source of energy and adequate supplies of propellant is very rare. Redundant equipment is provided in order to reduce the possibility of this type of premature end of life.

When, nevertheless, this type of breakdown does occur, the supplies of propellant are generally sufficient to enable the satellite to be ejected from its orbit without very great difficulty.

The sources of energy by means of photovoltaic conversion are also designed so that the energy supplied falls off slowly over the years and, unless there is an accident such as an untimely short circuit, it is unlikely that the energy sources will fail in such a way as to make a satellite totally unusable.

The most frequent cause of a satellite coming to the end of its life is therefore the satellite using up all of the propellant which enables it to keep station and to keep pointing towards the Earth.

Modern satellites use two-liquid propulsion systems having separate fuel and oxidizer tanks. This propulsion system is used for reasons of profitability throughout the life of the satellite in order to achieve the following objectives:

(1) At the beginning of the satellite's life, circularizing its orbit and positioning it on its orbit.

A major portion of the mass of the on-board propellant (which mass is generally of the same order as the mass of the remainder of the satellite) is burned in an "apogee" nozzle in order to increase the speed vector of the satellite sufficiently to move from an elongate elliptical or "transfer" orbit (having a perigee of a few hundred km and an apogee of about 36,000 km) to a circular orbit at an altitude of 36,000 km. The speed increment required by this operation lies in the range 1500 m/s and 1850 m/s, depending on the launcher used.

(2) Orbit control

Once put on station in its orbital position, the satellite is subjected to disturbing forces (Moon/Sun attraction, solar radiation pressure, etc.) tending to cause it to describe cyclic movements of increasing amplitude about its initial position.

Since ground stations are pointed towards a fixed point in the sky, in order to avoid over-equipping ground stations with satellite-tracking devices, it is necessary to take action from time-to-time to oppose the disturbing movements of the satellite. This is done by cancelling the modulation to the satellite's speed vector caused by the disturbances, by periodicallly burning small quantities of propellant in orbit control nozzles.

(3) Orientation control

In like manner, the satellite is subjected to disturbing couples about its center of gravity which change the direction in which it is pointing. Propellant is therefore consumed from time to time in orientation control nozzles.

Conventional two-component propulsion systems generally contain two spherical tanks of the same diameter for the components of the propellant. Since the tanks are generally of the same volume, the on-board mass of fuel is different from the on-board mass of oxidizer, for equal volumes thereof, since they are of different densities. The injector holes into the nozzles are calibrated for equal volume consumption of the two components.

Given the speed increments that need to be given to the satellite, the total initial on-board propellant mass is generally of the same order as the mass of the remainder of the satellite.

With increasing satellite mass, it is becoming difficult to store the on-board propellant in two tanks only. The number of tanks has thus increased in order to allow more propellant to be stored on board. Some satellites have therefore been fitted with four identical tanks: two oxydizer tanks, and two fuel tanks.

In both of the above-described systems the on-board volumes of fuel and oxidizer are initially identical, so when either of them comes to the end of its life, one of the two components will run out slightly before the other, by virtue of dispersions in the bores of the injector holes and in the flow rates through the valves.

At this moment, while the remaining component is still being supplied, the empty tank will no longer provide the expected component but only the remainder of the gas used for pressurizing it. The expected chemical reaction no longer occurs, and the specific impulse falls off greatly, as does the resulting thrust. The satellite will thus not respond to the desired maneuver and rapidly becomes uncontrollable.

On the ground, the user is informed by the satellite responding in an unexpected manner, but at this moment the satellite can no longer be ejected from its orbit since one of the two propellant components is missing, unless there is an addtional propellant supply which can be made available under ground control.

Such a maneuver would be possible using a redundant two liquid storage system of smaller capacity (since the required speed increment is only a few meter/second), or using an independent powder propulsive system. In addition to requiring twice as many electrical controls, such systems suffer from the drawback of being systems that remain in waiting throughout the life of the satellite and are activated only after a period of several years. Their operating reliability is chancy and certainly less than the reliability of the system which has been used regularly and continuously throughout the life of the satellite.

Thus, in order to be able to use the same system it must be possible to predict the end of propellant consumption accurately in order to start the out-of-orbit ejection operation. The smaller the accuracy of the prediction system, the greater the loss of usable commercial time on the satellite.

The presence of liquid propellant components inside the tanks under conditions of weightlessness makes any system for measuring the residual quantity of propellant components highly inaccurate, and at present, there is no satisfactory means for enabling the user to make use of all of the on-board propellant components, so as to eject the satellite at the last moment.

A very difficult compromise must therefore be implemented: either the satellite is ejected prematurely from its orbit and a period of profitable commercialization is lost, or else the satellite is used to the full up to the last moment, in which case there is a danger of not being able to eject it from its orbital position.

The aim of the present invention is to provide a two-component propulsive system suitable for solving the above-mentioned problems.

According to the present invention a two-component propulsive system for an artificial satellite, in particular for a geostationary satellite, the system being intended to provide advance warning of the end of the normal lifetime of the satellite and to ensure that said satellite is extracted from its operating orbit, the system being of the type comprising a unit for pressurizing the propellant components contained in the feed tanks of an apogee nozzle and of a plurality of low-thrust nozzles for controlling the orientation and the orbit of the satellite, the various nozzles being fed with propellant components via electrically controlled valves, is characterized in that the propellant supply is unequally distributed between at least two pairs of associated tanks, with each pair comprising an oxidizer tank and a fuel tank, in that a first pair of tanks contains an excess quantity of a first propellant component relative to the volume of the second component contained in the associated tank, while a second pair of tanks contains an excess quantity of the second propellant component relative to the volume of the first component contained in the associated tank, and in that the associated tanks of the various pairs are suitable for being put into service for successive equal determined periods of time during the normal lifetime of the satellite so that detecting that a first propellant component has been exhausted in a tank associated with a tank containing an excess of the second propellant component indicates that the length of the residual normal lifetime of the satellite is at least approximately equal to said determined period of the successive service times of the various pairs of tanks, and that after exhaustion of the second propellant component from the tank associated with a tank containing an excess quantity of the first propellant component, the two tanks belonging to different pairs and each containing an excess quantity of one of the fuel components are associated with each other by appropriate commands to the electrically operated valves in order to feed the low-thrust nozzles in order to provide the satellite with the impulse necessary to extract the satellite from its operating orbit.

Other characteristics and advantages of the present invention appear from reading the detailed description given with reference to the accompanying drawing which is a diagram of such a two-component propulsive system for an artificial satellite.

The propulsive system in accordance with the invention comprises a control unit 10 for controlling the pressure of the propellant components. In conventional manner, this unit 10 includes: a tank of inert gas under pressure, in particular a tank of helium; electrically controlled valves; non-return valves; pressurestats; and filters; with all of these members being mounted upstream from the various propellant tanks 12, 14, 16, and 18.

In the particular embodiment shown in the accompanying drawing, there are four propellant tanks. The tanks 12 and 14 contain the oxidizer while the tanks 16 and 18 contain the fuel. In accordance with the present invention, one of the oxidizer tanks, e.g. the tank 12, and one of the fuel tanks, e.g. the tank 18, contain an excess quantity of propellant component compared with the volume of the other component contained in the associated tank. This excess quantity is shown diagrammatically by the letter $\Delta$ on the accompanying drawing.

The four tanks 12, 14, 16, and 18 are coupled to the various nozzles via a feed circuit including respective nonreturn valves 20 mounted in the outlet circuit from each tank immediately downstream therefrom. Downstream from the various non-return valves 20, the outlet circuit from each tank contains an electrically controlled valve 22, 24, 26, or 28, associated with a respective one of the tanks 12, 14, 16, and 18.

As can be seen from the accompanying drawing, the outlet circuits from the tanks meet at 30 and 32 in order to define a common feed circuit to the various nozzles. Downstream from the points 30 and 32, the common nozzle feed circuit includes two filters 34 and 36.

The propulsive system in accordance with the invention includes an apogee nozzle 38 coupled to the common feed circuit via electricallly controlled valves 40 and 42. The system also includes a first group of low-thrust nozzle 44 for controlling the orientation and the orbit of the satellite once it is on station on its geostationary satellite orbit. The feed circuit for this first group of nozzles 44 includes two electrically controlled valves 46 and 48.

In conventional manner, the system also includes a second group of low-thrust nozzles 50 having a feed circuit likewise including two electrically controlled valves 52 and 54. This second, redundant group of low-thrust nozzles is provided solely for use in the event that one or more of the nozzles in the first group of nozzles becomes defective.

As mentioned above, the tanks 12 and 18 contain excess propellant component, with the excess being determined in such a manner as to correspond to a volume which is not less than the volume of each of the components required for ejecting the satellite over twice 12 hours and for controlling the course of ejection operations. It is advantageous to provide a safety margin and thus to choose the excess volumes of propellant components to be slightly greater than the volumes necessary for such satellite ejection.

During the initial stage when the satellite is put into orbit, the propellant components are fed simultaneously from all four tanks 12, 14, 16, and 18. To do this, the electrically operated valves 22, 24, 26, and 28 and also the electrically operated valves 40 and 42 are open, thereby actuating the apogee nozzle 38. Naturally, during this stage, the electrically operated valves 46, 48, 52, and 54 are kept closed. During this initial orbit-establishing stage, an equal quantity of propellant component is thus taken from each of the tanks. As a result, the excess component volumes in the tanks 12 and 18 relative to the tanks 14 and 16 remain unchanged. Once the satellite is on station, the valves 40 and 42 are closed and the apogee nozzle is isolated.

From this moment on, i.e. throughout the normal life of the satellite, the orientation and orbit controlling nozzles 44 and 50 are fed with propellant components by suitable control of the electrically-controlled valves 22, 24, 26, 28, 46, 48, 52, an 54 so as to take the components successively and for the same determined periods of time from the various pairs of associated tanks. For example, the tank 12 containing excess oxidizer is combined with the tank 16 which does not contain excess fuel. To do this the valves 22 and 26 are opened while the valves 24 and 28 are closed, and this continues for said determined period of time which may, for example, be advantageously chosen to be about six months.

At the end of this period, the valves 22 and 26 are closed and the valves 24 and 28 are opened, thereby enabling the tank 14 which does not contain excess oxidizer to be combined with the tank 18 which does contain excess fuel.

If the propulsive system in accordance with the invention includes at least one additional pair of tanks which are equally filled, in addition to the two pairs of unequally filled tanks, then the equally filled pairs of tanks are used first. It is therefore necessary to provide means for identifying which pairs of tanks are unequally filled and/or which pairs of tanks are equally filled.

By operating in this way, there comes a moment near the end of the life of the satellite when it is observed that the first propellant component in the first pair of unequally filled tanks has been exhausted. This provides information concerning the residual normal lifetime of the satellite. This residual normal lifetime of the satellite is at best approximately equal to said determined period of time for which the different pairs of tanks are succcessively put into operation. In practice, the period for which the different pairs of unequally filled tanks are successively switched into service is determined so that the informatiton obtained on the reaining lifetime is as long as possible a period of time, and consequently is as close as possible to the successive switchover periods of the various pairs of tanks. In practice, this period can be predetermined without difficulty as a function of the predicted normal duration of satellite lifetime together with the approximately estimated consumption by the various nozzles in the propulsive system.

In practice, the exhaustion of one of the pairs of unequally filled tanks may be observed in various different ways. The exhaustion of one of the propellant components may be detected, for example, by the change in the specific impulse to which the satellite is subjected. It is then possible to detect the exhaustion of one of the components, e.g. by trajectory plotting.

Several other methods may also be used, such as measuring the temperatures of the nozzles or the pressures of their chambers.

Such an observation may naturally be performed by measurements made from the ground using Doppler effect or interferometric radar.

A failure to perform an orientation command may also be detected by the non-desaturation of the kinetic or reaction wheels, which can be observed from the speed of rotation of said wheels. Also, the failure to obtain the expected correction couple may also be observed from indications provided by gyros (integrating or not) or from observations provided by electromagnetic source detectors (for detecting the Earth, the Sun, or stars).

Once the exhaustion of the first propellant component in the first pair of unequally filled tanks has been detected, the electrically controlled valves are switched over so as to use up the components in the second pair of unequally filled tanks. After this last period of using the second pair of tanks, the electrically controlled valves are switched so as to associate tanks belonging to different pairs and each containing one of the propellant components in excess. In the embodiment described, the valves 24 and 26 are closed and the valves 22 and 28 are opened at the end of the normal life of the satellite in order to feed the low-thrust nozzles, thereby providing the satellite with the impulse required to extract it from the geostationary satellite orbit to a non-operating orbit. As mentioned above, the amounts of excess oxidizer and of excess fuel contained in the tanks 12 and 18 respectively are determined so as to ensure that the ejection operations can be properly performed during two half-periods of twelve hours each, during which it is still necessary to control the position of the satellite.

Naturally, the present invention is not limited to the above-described embodiment and utilization, and it is perfectly possible to imagine certain variants thereto without going beyond the scope of the invention.

I claim:

1. A two fuel component propulsive system for an artificial satellite, in particular for a geostationary satellite, the system being intended to provide advance warning of the end of the normal lifetime of the satellite and to ensure that said satellite is extracted from its operating orbit, the system comprising:
   at least two pairs of tanks with each pair including a fuel tank and an oxidizer tank, wherein the oxidizer tank of one pair can hold a quantity of oxidizer greater than the quantity of fuel held by the paired fuel tank by a specific amount and wherein the fuel tank of the other pair can hold a quantity of fuel greater than the quantity of oxidizer held by the paired oxidizer tank by the same specific amount,
   a plurality of nozzles for propelling and guiding said satellite,
   conduit means for supplying a fuel and an oxidizer from said tanks to each of said nozzles,
   valve means in said conduit means, and
   control means for selectively operating said valves to initially connect said one pair of tanks to at least one selected nozzle until said fuel tank thereto is exhausted, to subsequently connect said other pair of tanks to at least one selected nozzle until said oxidizer tank thereof is exhausted and to finally connect the oxidizer tank of said one pair and said fuel tank of said other pair to at least one selected nozzle.

2. A two fuel component propulsive system as set forth in claim 1, wherein said conduit means include a conduit having an electrically controlled valve leading from each oxidizer tank to a common conduit which in turn is connected to said nozzles and wherein said conduit means includes a conduit having an electrically controlled valve connected between each fuel tank and a second common conduit which in turn is connected to said nozzles.

3. A process for controlling a two fuel component, propulsive system for an artificial satellite, in particular for a geostationary satellite to provide advance warning of the end of the normal lifetime of the satellite and to ensure that the satellite is extracted from its operating orbit, the process comprising:
   pressurizing the propellant components contained in the fuel tank of an apogee nozzle and a plurality of low-thrust nozzles for controlling the orientation and the orbit of the satellite,
   achieving an unequl distribution of the propellant supply between at least two pairs of associated tanks with each pair comprising a first component tank and a second component tank, whereby a first pair of tanks contains an excess quantity of a first component relative to the quantity of the second component contained in the associated tank while a second pair of tanks contains an excess quantity of the second component relative to the quantity of the first component contained in the associated tank,
   supplying the first and second components to selected nozzles from said first pair of said tanks until the second component is exhausted,
   supplying the first and second components to selected nozzles from the second pair of tanks until the first component is exhausted and
   switching the supply of first and second components to selected nozzles from the tank of each pair still containing said first and second components in order to provide the satellite with the impulse necessary to extract the satellite from its operating orbit.

* * * * *